United States Patent [19]
Stumpner

[11] 3,937,931
[45] Feb. 10, 1976

[54] PROCEDURE TO DETERMINE THE TEMPORAL MEAN OF A QUANTITY TO BE MEASURED, AS A FUNCTION OF ITS PERIOD OF OPERATION

[75] Inventor: Gerhard Stumpner, Munich, Germany

[73] Assignee: Siemens Aktiengesellschaft, Berlin & Munich, Germany

[22] Filed: Sept. 28, 1971

[21] Appl. No.: 184,553

[30] Foreign Application Priority Data
Sept. 30, 1970 Germany.............................. 2048149

[52] U.S. Cl......... 235/92 EC; 235/92 R; 235/92 EV
[51] Int. Cl.² ..................... H03K 21/36; G06M 3/04
[58] Field of Search........ 235/92 EV, 92 FQ, 92 EC

[56] References Cited
UNITED STATES PATENTS
3,348,196  10/1967  Willrett.......................... 235/92 EV
3,588,473   6/1971  Meyer............................. 235/92 FQ Primary Examiner—Joseph M. Thesz, Jr.

[57] ABSTRACT

A method is described for determining and indicating the time mean of a measured quantity as a function of its period of operation. A signal is generated responsive to the exceeding of a predetermined pair of values or coordinates of mean and period of operation of the quantity being measured. The measured quantity is integrated, and an extinguishing quantity is superimposed on the measured quantity. The value of the extinguishing quantity as a function of the instantaneous value of the quantity being measured is chosen so that a uniform storage state of the integrator corresponds with the pairs of values of mean of the quantity being measured and its period of operation.

2 Claims, 2 Drawing Figures

PROCEDURE TO DETERMINE THE TEMPORAL MEAN OF A QUANTITY TO BE MEASURED, AS A FUNCTION OF ITS PERIOD OF OPERATION

BACKGROUND OF THE INVENTION

The invention relates to a method for determining the time mean value of a measured quantity as a function of its period of operation. The invention is particularly related to a method for generating a signal responsive to the exceeding of specified pairs of values of mean and period of operation of the measured quantity.

Such a method is, for example, necessary in the monitoring of automatically operating telecommunications exchange equipment. The quantity to be measured may be, for example, error frequency and the specified pairs of values of mean and period of operation of the quantity to be measured are, for example, limiting values. It may be the case that the device being monitored must be shut off and, if necessary, replaced by another device of the same type, when such limiting values are exceeded.

It is known that to determine the time mean of a quantity to be measured, that amount, or an amount proportional to it, is connected to the input of an integrator. The time integral of the quantity to be measured delivered at the output of the integrator is then divided by the period of operation, i.e., the duration of the integration interval. The quotient is the desired time mean of the quantity to be measured. If the determination of the time mean is a function of different values of the integration interval, then the formation of the quotient must proceed continuously between time integral and integration interval. From this discussion, it becomes obvious that a substantial financial outlay for apparatus is necessary, which outlay is increased further in that the continuous formation of a quotient is generated (e.g., a switching command to a replacement circuit for the device being monitored) must be compared with the specified value pairs, in particular, a continuous curve connecting these value pairs.

It is an object of the invention to provide a method for determining the time mean of a quantity being measured as a function of its period of operation.

It is a further object of this invention to provide a method for generating a signal responsive to the exceeding of specified value pairs of mean and duration of operation of the quantity being measured.

SUMMARY OF THE INVENTION

The invention assumes that the quantity being measured is coupled to at least one integrator adapted to derive the desired type of mean (e.g., arithmetic or quadratic mean). The invention is characterized by the fact that an extinguishing quantity is superimposed on the quantity to be measured, and that the waveform of this extinguishing quantity, as a function of the instantaneous value of the quantity to be measured, is chosen so that the specified value pairs of mean and duration of operation of the quantity to be measured correspond to a uniform storage capacity of the integrator.

The method according to the invention has the advantage that through achieving uniform storage capacity for the integrator, it is directly indicated that one of the specified value pairs of mean and duration of operation of the quantity to be measured, i.e., corresponding value pairs on a "limiting value curve" connecting the specified value pairs with each other, has been exceeded.

It is a characteristic of the method of the invention that to generate a signal (e.g., a switching command to the replacement circuit for the device being monitored), knowledge of the integration interval, that is of the period of operation of the quantity to be measured, is not necessary. If the integration interval for the time mean of the quantity to be measured, where the "limiting curve" has been exceeded, should nonetheless be of interest, then, in accordance with a further feature of the invention a simple chronometer may be used. The chronometer can be switched on at the beginning of the integration process and switched off by a signal, which, for example, may be derived by a suitable discriminator when the uniform storage capacity of the integrator corresponding to the specified value pairs of mean and duration of operation of the quantity to be measured has been reached.

BRIEF DESCRIPTION OF THE DRAWINGS

The principles of the invention will be best understoody by reference to a detailed description of a preferred form of its excecution given hereinbelow in conjunction with the drawings in which.

DETAILED DESCRIPTION OF THE DRAWINGS

Figure 1:
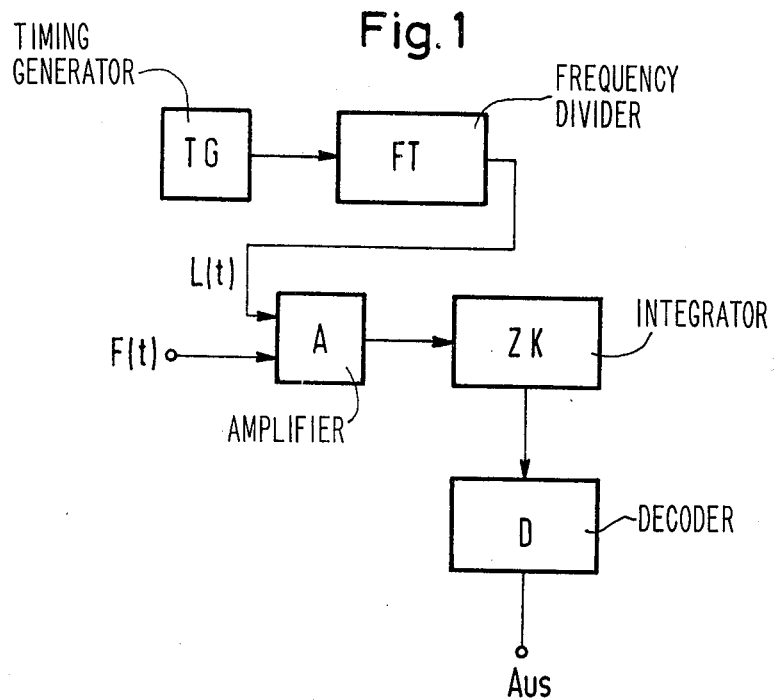
FIG. 1 is a schematic block diagram of an exemplary circuit capable of performing the method of the invention and FIG. 2 is a "limiting value" curve within which the FIG. 1 embodiment operates.

For the sake of simplicity in the description given hereinbelow, it is assumed that the integrator used is a linear storage device, although the invention obviously is not confined to the use of linear stores as integrators. It is further assumed that the extinguishing quantity $L(t)$ is the opposite polarity to the quantity to be measured $F(t)$, and that the integration starts at moment $t_o$, when the value of the quantity to be measured $F(t)$ exceeds the value of the extinguishing quantity $L(t)$ for the first time. The time mean of the quantity to be measured $F(t)$ is defined as:

$$\overline{F(t)} = \frac{1}{T} \int_{t_o}^{t_o + T} F(t)\, dt \qquad (1)$$

If the quantity to be measured $F(t)$ and the extinguishing quantity $L(t)$ of opposite polarity are directed to the integrator, then the following applies to the storage state or the values of the stored quantity $S(t)$ measured at the output of the integrator, which storage state is a function of time just as are the quantity to be measured and the extinguishing quantity, $$F(t) - L(t) = \frac{dS(t)}{dt} \qquad (2)$$

That is, after execution of the integration and division by the integration interval $T$ $$\frac{S(T)}{T} = \frac{1}{T} \int_{t_o}^{t_o + T} [F(t) - L(t)]\, dt. \qquad (3)$$

The extinguishing quantity $L(t)$ is chosen, according to the invention, such that the storage state or stored quantity value $S(t)$ should have a uniform value for different specified value pairs of the mean $\overline{F(t)}$ and the integration interval $T$ of the quantity to be measured $F(t)$. The method of the invention is especially simple, when only two such value pairs are specified, for example the value pairs $(F_1; T_1)$ and $(F_2; T_2)$. The extinguishing quantity can be a constant $L_o$ in this case. If one puts the specified value pairs $(F_1; T_1)$ and $(F_2; T_2)$ into the equation (3), and if one denotes the storage state of the integrator, which in accordance with the assumptions should be equal for both value pairs, with $S_o$, then one gets two defining equations $$\frac{S_o}{T_1} = F_1 - L_o \text{ and } \frac{S_o}{T_2} = F_2 - L_o \qquad (4)$$

from which the quantities $L_o$ and $S_o$ can be determined:

$$L_o = \frac{F_2 T_2 - F_1 T_1}{T_2 - T_1}; \quad S_o = \frac{F_1 - F_2}{T_2 - T_1} T_1 \cdot T_2 \qquad (5)$$

Conversely, if one substitutes these values for $L_o$ and $S_o$ in the equation (3), then one obtains the equation $$\overline{F(t)} = L_o + \frac{S_o}{T}. \qquad (6)$$

The equation (6) represents the above mentioned "limiting curve," i.e., it characterizes all those value pairs or coordinates of mean and period of operation of the quantity to be measured $F(t)$, to which the uniform storage state $S_o$ of the integrator corresponds. Therefore, when this curve is exceeded, a signal is emitted.

If the "limiting curve" passes through more than two specified value pairs or coordinates of mean and period of operation of the quantity being measured, the extinguishing quantity $L(t)$ must be chosen in a corresponding manner as a suitable function from the instantaneous value of the quantity to be measured $F(t)$. Another possibility for defining the course of the "limiting curve," such that it passes through more than two specified value pairs of mean and period of operation of the quantity being measured comprises connecting a corresponding number of integrators with, respectively, constant extinguishing quantities in parallel and of, disjunctively connecting the outputs of their associated discriminators to the storage. The latter connection may be effected by an OR gate. The result is a "limiting curve" composed of hyperbola-sections, which pass through the desired points. The quantity to be measured, the time mean of which is to be determined, consists to a large extent of a series of digital binary pulses appearing in a fixed time frame. Such a quantity to be measured can also be subjected to the method of the invention, whenever the extinguishing quantity also comprises a series of pulses and whenever the integrator is constructed in the form of a forward and backward counting counter circuit. In case the extinguishing quantity can be a function of the instantaneous value of the quantity being measured, i.e., if only two value pairs are specified for the "limiting curve" of mean and period of operation of the quantity being measured, then it is possible to generate this extinguishing quantity through a simple frequency divider from the frequency of a timing signal generator, which also produces the time frame for the quantity being measured.

A simple practical example of the invention is shown in FIG. 1. This figure illustrates an arrangement which, according to the method of the invention, generates a changeover signal for a replacement circuit for a telecommunications exchange switching circuit. The following limiting values are defined as conditions for a change-over:

Mean signal error 100% for a period longer than 350 ms and

Mean signal error 20% for a period longer than 30 s.

If one substitutes these value pairs into equation (5), then one obtains:

$$L_o = \frac{20\% \cdot 30 \text{ s} - 100\% \cdot 0.35 \text{ s}}{30 \text{ s} - 0.35 \text{ s}} = 19.06\% \qquad (7)$$

$$S_o = \frac{100\% - 20\%}{30 \text{ s} - 0.35 \text{ s}} \cdot 0.35 \text{ s} = 28.3\% \text{ s}.$$

The quantity to be measured $F(t)$, which here represents the error rate, exists in digital form, i.e., pulses are emitted in a fixed time frame, in case erroneous signals appear. The fixed time frame is generated by a timing signal generator TG, which in the example at hand may have a frequency of $Z = 100$ signals/s. If one multiplies the results of equation (7) with this frequency and divides by the dimension-less value 100%, one obtains $L_o = 19.06$ signals/s, $S_o = 28.3$ signals.

Integration ZK is constructed, in accordance with the character of the quantity being measured and the extinguishing quantity, as a forward and backward counting counter circuit in order to measure pulse signals. Since the counter chain can store only whole-numbered integration results, the value $S_o = 28$ signals is set as the storage state $S_o$. This setting requires a correction of the value of the extinguishing quantity $L_o$. One obtains the value $L_o = 20$ signals/s, if one substitutes into equation (4) the values $S_o = 28$ signals, $T_1 = 0.35$ s and $F_1 = 100$ signals/s.

FIG. 1 shows a schematic diagram of an exemplary arrangement for executing the method of the invention. The arrangement is shown in block form. Each of the blocks is constituted by elements of known construction, adjusted to operate according to the parameters discussed hereinabove. It comprises a counter chain ZK, which may consist of bistable switching stages. A decoding device D is attached, to the output ZK and this may be constructed as a simple trigger circuit connected to ZK as to be responsive to 28 counts, so that $S_o = 28$ signals is decoded and transformed into a changeover signal. An amplifier A is provided for coupling the $F(t)$ and $L(t)$ signals to the integrator ZK. The extinguishing quantity $L(t)$, which has the constant value $L_o = 20$ signals, is taken from the frequency of the timing signal generator TG by means of a frequency divider FT, which divides the frequency $Z = 100$ signals/s in the ratio 5:1. The changeover signal appears at output Aus, of decoder D, when the counter chain ZK has reached the chain setting $S_o = 28$ signals.

Figure 2:
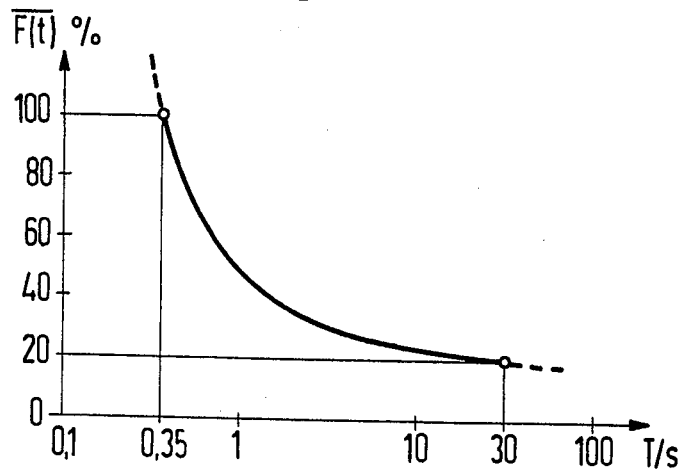

FIG. 2 shows the changeover characteristic graph of the arrangement, denoted previously as the "limiting curve."

The preferred form for execution of the invention described hereinabove is to be considered only as exemplary of the principles of the invention. Reference must be had to the appended claims for definition of the scope of the invention.

I claim:

1. A method for measuring the time mean of a quantity being measured as a function of its period of operation, comprising the steps of:

applying the quantity being measured to an integrator, producing a constant extinguishing quantity which is a function of at least two predetermined pairs of values for said time mean and the integration period of the quantity being measured and which is of a value such that the storage capacity of said integrator is uniform for said predetermined pairs of values for said time mean and the integration period of the quantity being measured, superimposing said extinguishing quantity on said quantity being measured and generating a signal from the values stored in said integrator responsive to the exceeding of said value pairs.

2. The method defined in claim 1, wherein said quantity being measured and said extinguishing quantity are digital pulses and wherein said integrator is a binary counting means.

* * * * *